United States Patent Office 3,134,821
Patented May 26, 1964

3,134,821
PROCESS FOR THE MANUFACTURE OF 1-BROMO-1-CHLORO-2,2,2-TRIFLUOROETHANE
James Chapman and Robert Leslie McGinty, both of Widnes, England, assignors to Imperial Chemical Industries Limited, Millbank, London, England, a corporation of Great Britain
No Drawing. Filed June 23, 1961, Ser. No. 119,016
Claims priority, application Great Britain July 5, 1960
3 Claims. (Cl. 260—653.7)

This invention relates to the manufacture of 1-bromo-1-chloro-2:2:2-trifluoroethane of the formula

which is eminently useful as an inhalation anaesthetic.

In British patent specification No. 805,764 a two-stage process for the manufacture of the inhalation anaesthetic 1-bromo-1-chloro-2:2:2-trifluoroethane is disclosed which involves the bromination of trichloroethylene to give 1:2-dibromo-1:1:2-trichloroethane followed by the fluorination with hydrogen fluoride of the latter compound in the presence of an antimony fluorochloride catalyst to give said trifluoro compound.

During the course of the reaction an intermediate product 1-bromo-1:2-dichloro-2:2-difluoroethane,

is formed and the reaction product is generally a mixture of the bromodichlorodifluoroethane and the bromochlorotrifluoroethane which can be separated from one another. This process is a convenient process inasmuch as two stages only are required from the starting material, trichloroethylene. Although best yields are obtained when the antimony content of the catalyst is initially in the wholly pentavalent state the yield of the bromochlorotrifluoroethane when the 1-bromo-1:2-dichloro-2:2-difluoroethane is isolated and used as the starting material is 40%–45% on the organic reactant consumed. Such yields cannot be held to be high in view of the yields to be obtained by the present process.

We have now found that 1-bromo-1-chloro-2:2:2-trifluoroethane may be produced in high yield by heating 1:2-dibromo-1-chloro-2:2-difluoroethane with substantially anhydrous hydrogen fluoride in the presence of an antimony fluorochloride catalyst at elevated temperature, at least part of the antimony being in the pentavalent state.

The reaction may be carried out satisfactorily over a wide temperature range. In particular good yields are obtained in the range 70° C. to 160° C.

The proportion of hydrogen fluoride to be employed towards organic starting material is not critical. Good results may be obtained when using from an approximately equimolar amount of hydrogen fluoride up to 3 moles of hydrogen fluoride per mole of organic material. For economic reasons it is preferred not to employ too great an excess of hydrogen fluoride.

In general useful results are obtained when the catalyst contains at least 20% by weight of pentavalent antimony.

The starting material of the present invention, 1:2-dibromo-1-chloro-2:2-difluoroethane, is obtained very readily and in almost quantitative yield by reaction of bromine with 2-chloro-1:1-difluoroethylene, which in turn can be obtained by dehalogenation of 1:2:2-trichloro-1:1-difluoroethane or by dehydrohalogenation of 1:2-dichloro-1:1-difluoroethane. Starting from 2-chloro-1:1-difluoroethylene a useful two-stage process is therefore provided for the production of 2-bromo-2-chloro-1:1:1-trifluoroethane.

The following examples illustrate but do not limit the invention:

Example 1

912 parts of antimony trichloride, 1190 parts of antimony pentachloride and 560 parts of anhydrous hydrogen fluoride were heated in a mild steel autoclave for 1 hour at a temperature of 100° C. to 110° C. The hydrogen chloride evolved was released through a reflux condenser which was also within the pressure system and was cooled with solid carbon dioxide and trichloroethylene at such a rate that the pressure was maintained at 500 lb. per square inch gauge.

1034 parts of 1:2-dibromo-1-chloro-2:2-difluoroethane and 155 parts of anhydrous hydrogen fluoride were then added to the catalyst. The temperature was then maintained at 120° C. to 130° C. for 4 hours, the pressure being maintained at 250 lb. per square inch by venting off hydrogen bromide gas. On cooling and venting off residual pressure the organic material was distilled from the autoclave and washed with aqueous caustic soda solution and water. 592 parts of washed and dried organic material were obtained and found to contain 474 parts of 1-bromo-1-chloro-2:2:2-trifluoroethane representing a 60% yield on the dibromochlorodifluoroethane charged to the process. The product was analysed by infra-red spectroscopy and was found to be free from the isomer 1-bromo-2-chloro-1:1:2-trifluoroethane.

Example 2

2400 parts of antimony pentachloride and 640 parts of anhydrous hydrogen fluoride were heated in a mild steel autoclave for 1½ hours at 100° C. to 106° C., the pressure being maintained at 640 lb. per square inch gauge.

1300 parts of 1:2-dibromo-1-chloro-2:2-difluoroethane and 100 parts of anhydrous hydrogen fluoride were then added to the catalyst. The temperature was then held at 80° C. to 86° C. for 5¾ hours, the pressure reaching 130 lb. per square inch gauge. On cooling and venting off residual pressure the organic material was distilled from the autoclave. The distilled material was washed with aqueous caustic soda solution and water, dried, and was found to contain 665 parts of 1-bromo-1-chloro-2:2:2-trifluoroethane representing a 68% yield on the dibromochlorodifluoroethane charged to the process.

Example 3

1800 parts of antimony pentachloride, 342 parts of antimony trichloride and 480 parts of anhydrous hydrogen fluoride were heated in a mild steel autoclave for 1 hour at 100° C. to 105° C., the pressure being maintained at 680 lb. per square inch.

1040 parts of 1:2-dibromo-1-chloro-2:2-difluoroethane and 80 parts of anhydrous hydrogen fluoride were then added to the catalyst. The temperature was then held at 145° C. to 150° C. for 2¼ hours, the pressure being maintained at 350 lb. per square inch by venting to atmosphere. On cooling and venting off residual pressure the organic material was distilled from the autoclave. The distilled material was washed with aqueous caustic soda solution and water, dried, and was found to contain 555 parts of 1-bromo-1-chloro-2:2:2-trifluoroethane representing a 70% yield on the dibromochlorodifluoroethane charged to the process.

What we claim is:

1. A process for the manufacture of 1-bromo-1-chloro-2:2:2-trifluoroethane which comprises heating 1:2-dibromo-1-chloro-2:2-difluoroethane with substantially anhydrous hydrogen fluoride in the presence of an antimony fluorochloride catalyst at elevated temperature, at least 20% and up to 100% by weight of the antimony being in the pentavalent state.

2. A process as claimed in claim 1 in which the process is carried out at a temperature in the range 70° C. to 160° C.

3. A process as claimed in claim 1 wherein the catalyst is prepared by heating antimony pentachloride and anhydrous hydrogen fluoride.

References Cited in the file of this patent
UNITED STATES PATENTS
2,921,099     Chapman et al. _____ Jan. 12, 1960